United States Patent
Kincaid et al.

(10) Patent No.: US 10,118,485 B2
(45) Date of Patent: Nov. 6, 2018

(54) DISCONNECTING ALL-WHEEL DRIVE DRIVELINE HAVING REAR DRIVE MODULE WITH DISCONNECTION AND DIFFERENTIAL LOCKING CLUTCHES

(71) Applicant: American Axle & Manufacturing, Inc., Detroit, MI (US)

(72) Inventors: Jeffrey L. Kincaid, Clarkston, MI (US); Robert C. Gorski, Clarkston, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 315 days.

(21) Appl. No.: 14/946,802

(22) Filed: Nov. 20, 2015

(65) Prior Publication Data

US 2017/0144540 A1    May 25, 2017

(51) Int. Cl.
| | |
|---|---|
| *B60K 17/348* | (2006.01) |
| *B60K 17/02* | (2006.01) |
| *B60K 23/08* | (2006.01) |
| *F16D 25/0638* | (2006.01) |
| *F16D 48/02* | (2006.01) |

(52) U.S. Cl.
CPC ............ *B60K 17/348* (2013.01); *B60K 17/02* (2013.01); *B60K 23/08* (2013.01); *F16D 25/0638* (2013.01); *F16D 48/02* (2013.01)

(58) Field of Classification Search
CPC ...... B60K 17/02; B60K 17/20; B60K 17/348; B60K 23/08; B60K 2023/0866; F16D 25/0638; F16D 25/061; F16D 48/02; F16D 48/0206
See application file for complete search history.

(56) References Cited

U.S. PATENT DOCUMENTS

| | | | |
|---|---|---|---|
| 8,469,854 B1 | 6/2013 | Downs et al. | |
| 2004/0248692 A1 | 12/2004 | Bryson et al. | |
| 2007/0060436 A1* | 3/2007 | Boddy | B60W 30/02 475/84 |
| 2011/0108384 A1* | 5/2011 | Reisch | F16D 25/061 192/69 |
| 2013/0029797 A1* | 1/2013 | Valente | F16H 48/20 475/86 |

(Continued)

*Primary Examiner* — Huan Le
*Assistant Examiner* — Lori Wu
(74) *Attorney, Agent, or Firm* — Harness, Dickey & Pierce, P.L.C.

(57) ABSTRACT

An all-wheel drive vehicle driveline can include an input member, differential, pump, first clutch, valve, and second clutch. The differential can include a case member, differential gearset, first output, and second output. The differential gearset can receive input torque from the case member and output differential torque to the first and second outputs. The pump can pump a fluid to a first conduit. The first clutch can transmit torque between the input and case members when a pressure in the first conduit exceeds a first predetermined pressure. The valve can couple the first conduit to a second conduit. The second clutch can couple the case member to the first output for common rotation when a pressure in the second conduit exceeds a second predetermined pressure. The valve can selectively permit fluid communication from the first conduit to the second conduit.

12 Claims, 4 Drawing Sheets

(56) References Cited

U.S. PATENT DOCUMENTS

| | | | | |
|---|---|---|---|---|
| 2014/0051541 A1* | 2/2014 | Osborn | ................ | B60K 23/08 |
| | | | | 475/209 |
| 2014/0190758 A1* | 7/2014 | Osborn | ............. | B60K 17/3462 |
| | | | | 180/364 |
| 2015/0330493 A1* | 11/2015 | Pritchard | ............... | F16H 48/32 |
| | | | | 475/86 |
| 2016/0023550 A1* | 1/2016 | Onitake | .............. | B60K 17/348 |
| | | | | 180/247 |
| 2016/0039284 A1* | 2/2016 | Osborn | ................ | B60K 17/35 |
| | | | | 180/245 |
| 2016/0280064 A1* | 9/2016 | Nozu | .................... | B60K 17/34 |

* cited by examiner

DISCONNECTING ALL-WHEEL DRIVE DRIVELINE HAVING REAR DRIVE MODULE WITH DISCONNECTION AND DIFFERENTIAL LOCKING CLUTCHES

FIELD

The present disclosure relates to disconnecting all-wheel drive drivelines having a rear drive module with disconnection and differential locking clutches.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction. Such AWD vehicles are typically equipped with a much more complex drivetrain (relative to a FWD architecture) which, in addition to the primary driveline, must include the additional components associated with the secondary driveline such as a power take-off unit, a propshaft and a rear drive module (RDM).

The RDM typically includes a differential unit to provide differential torque to a pair of secondary drive wheels (i.e., left and right rear wheels). In certain driving conditions, it can be beneficial to provide equal torque to both secondary drive wheels. Locking differentials configured to lock the differential unit to provide equal torque to each of the secondary drive wheels are generally known in the art. Such locking differentials typically incorporate a differential locking system including an actuator and additional locking parts to lock the differential unit for equal output.

Additionally, in an effort to minimize driveline losses associated with rotating components in the primary and secondary drivelines, which are either driven by the primary driveline or back-driven by the vehicle wheels, it is generally known to incorporate a separate disconnect system in the RDM unit that is configured to uncouple components of the secondary driveline such as, for example, the rear wheels or the rear differential from the remainder of the secondary driveline such as the propshaft for example. To this end, there remains a need in the art for development of improved driveline components for use in the disconnectable drivelines of AWD vehicles.

SUMMARY

This section provides a general summary of the disclosure, and is not a comprehensive disclosure of its full scope or all of its features.

An all-wheel drive vehicle driveline can include an input member, a differential, a pump, a first clutch, a first valve, and a second clutch. The differential can include a case member, a differential gear set, a first differential output, and a second differential output. The differential gear set can receive input torque from the case member and output differential torque to the first and second differential outputs. The pump can pump a fluid from a reservoir to a first conduit. The first clutch can transmit torque between the input member and the case member when a pressure in the first conduit exceeds a first predetermined pressure. The first valve can couple the first conduit to a second conduit. The second clutch can couple the case member to the first differential output for common rotation when a pressure in the second conduit exceeds a second predetermined pressure. When the first valve is open, the first valve can permit fluid communication from the first conduit to the second conduit. When the first valve is closed, the first valve can inhibit fluid communication from the first conduit to the second conduit.

An all-wheel drive vehicle driveline including an input member, a differential, a first clutch, a first hydraulic ram, a second clutch, a second hydraulic ram, a pump, and a first valve. The differential can include a case member, a differential gear set, a first differential output, and a second differential output. The differential gear set can receive input torque from the case member and output differential torque to the first and second differential outputs. The input member can be rotatable relative to the case member when the first clutch is operated in a first mode. The first clutch can transmit torque between the input member and the case member when the first clutch is operated in a second mode. The first hydraulic ram can have a first piston chamber and a first piston that is coupled to the first clutch and movable in the first piston chamber. The first piston can be movable between a first position wherein the first clutch is in the first mode and a second position wherein the first clutch is in the second mode. The case member can be rotatable relative to the first differential output when the second clutch is in a third mode. The second clutch can couple the case member to the first differential output for common rotation when the second clutch is in a fourth mode. The second hydraulic ram can have a second piston chamber and a second piston that can be coupled to the second clutch and movable in the second piston chamber. The second piston can be movable between a third position wherein the second clutch is in the third mode, and a fourth position wherein the second clutch is in the fourth mode. The pump can be coupled to the first piston chamber by a fluid conduit and configured to pump a fluid from a reservoir to the first piston chamber. When the first valve is open, the first valve can permit fluid communication from the fluid conduit to the second piston chamber. When the first valve is closed, the first valve can inhibit fluid communication from the fluid conduit to the second piston chamber.

An all-wheel drive vehicle driveline can include an input member, a differential, a pump, a first clutch, a first valve, and a second clutch. The differential can include a case member, a differential gear set, a first differential output, and a second differential output. The differential gear set can receive input torque from the case member and output differential torque to the first and second differential outputs. The pump can pump a fluid from a reservoir to a first conduit. The first clutch can include a plurality of first clutch plates, a plurality of second clutch plates, a first piston chamber, and a first piston. The first clutch plates can be coupled to the input member for common rotation. The second clutch plates can be interleaved with the first clutch plates and coupled to the case member for common rotation. The first piston chamber can be in fluid communication with the first conduit. The first piston can be disposed in the first piston chamber. When a pressure in the first piston chamber exceeds a first predetermined pressure, the first piston can move from a first position that is retracted relative to the first and second clutch plates to a second position that is extended toward the first and second clutch plates to a greater extent than when the first piston is in the first position. The first clutch plates can engage the second clutch plates to transmit torque between the input member and the case member when the first piston is in the second position. The first valve can couple the first conduit to a second conduit. When the first valve is open, the first valve can permit fluid communication from the first conduit to the second conduit. When the first valve is closed, the first valve can inhibit fluid communication from the first conduit to the second conduit. The second clutch can include a first locking member, a second locking member, a clutch member, a second piston chamber, and a second piston. The first locking member can be coupled to the case member for common rotation. The second locking member can be coupled to the first differential output for common rotation. The clutch member can be movable between a third position wherein the clutch member is rotatable relative to one of the first or second locking members, and a fourth position wherein the clutch member is coupled for common rotation with the first and second locking members. The second piston chamber can be in fluid communication with the second conduit. The second piston can be disposed within the second piston chamber. When a pressure in the second piston chamber exceeds a second predetermined pressure, the second piston can move the clutch member from the third position to the fourth position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
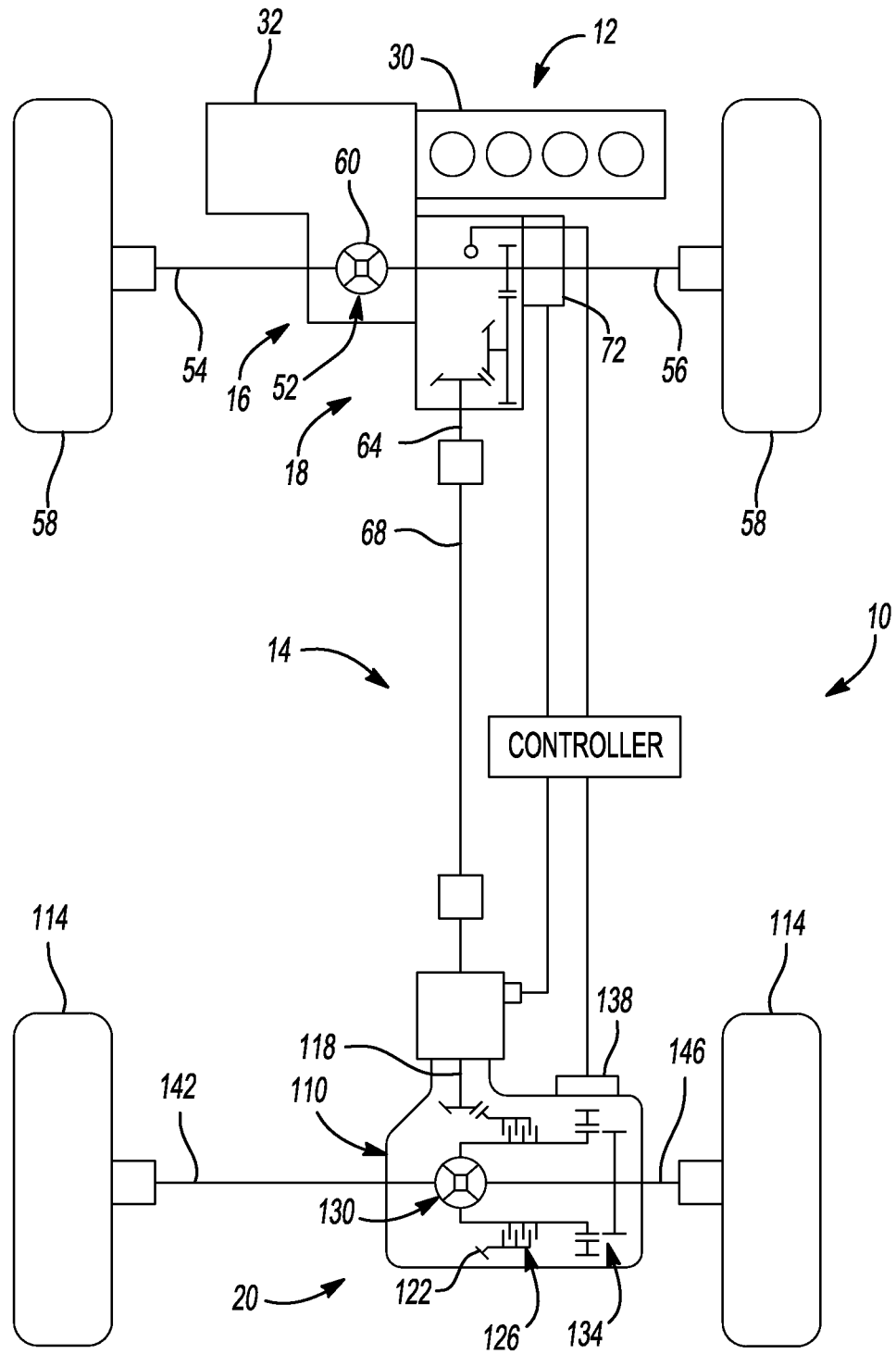
FIG. 1 is a schematic illustration of a vehicle having a disconnecting AWD driveline including a rear drive module constructed in accordance with the teachings of the present disclosure.

With reference to FIG. 1 of the drawings, an exemplary vehicle 10 is illustrated to include a powertrain 12 and a drivetrain 14 that can include a primary driveline 16, a power take-off unit (PTU) 18, and a secondary driveline 20. The powertrain 12 can include a prime mover 30, such as an internal combustion engine or an electric motor, and a transmission 32, which can be any type of transmission, such as a manual, automatic or continuously variable transmission. The prime mover 30 can provide rotary power to the transmission 32, which outputs rotary power to the primary driveline 16 and the PTU 18. The PTU 18 can be constructed in any suitable manner to be selectively operated to transmit rotary power to the secondary driveline 20. For example, the PTU 18 can be constructed as described in commonly-assigned U.S. Pat. No. 8,961,353, the disclosure of which is incorporated by reference as if fully set forth in detail herein.

In general, the primary driveline 16 can include a first differential 52 and a pair of axle half-shafts (first half-shaft 54 and second half-shaft 56) that can couple an output of the first differential 52 to a first set of vehicle wheels 58. The first differential 52 can be conventional in its construction and operation and as such, need not be discussed in significant detail herein. Briefly, the first differential 52 can include a first differential case 60, which can be driven by the transmission 32, and a means for transmitting rotary power between the first differential case 60 and the first and second half-shafts 54, 56. In the example provided, the rotary power transmitting means is an open differential gearset that permits speed and torque differentiation between the first and second half-shafts 54, 56.

In general, the PTU 18 includes a PTU output member 64 that is coupled to a propshaft 68 for common rotation about a longitudinal axis of the vehicle 10. The PTU 18 can also include a disconnect mechanism 72 to selectively control power transmission through the PTU 18 to thereby selectively drive the propshaft 68.

In the particular example provided, the secondary driveline 20 includes the propshaft 68 and a rear axle assembly 110 that is configured to receive rotary power from the propshaft 68 and to responsively drive a second set of vehicle wheels 114. In general, the rear axle assembly 110 can include an input pinion 118, a ring gear 122, a disconnect clutch 126, a second differential 130, a locking clutch 134 and a clutch actuating system 138. The input pinion 118 can be coupled to the propshaft 68 for common rotation about the longitudinal axis of the vehicle 10. The ring gear 122 can be meshingly engaged with the input pinion 118 to receive rotary power therefrom. The second differential 130 can be conventional in its construction and operation and as such, need not be discussed in significant detail herein. Briefly, the second differential 130 can be selectively coupled and decoupled for common rotation with the ring gear 122 by the disconnect clutch 126. In the example provided, the second differential 130 includes a rotary power transmitting means that is an open differential gearset that permits speed and torque differentiation between a third half-shaft 142 and a fourth half-shaft 146. The third and fourth half-shafts 142, 146 can be drivingly coupled to a respective one of the vehicle wheels 114. The clutch actuating system 138 can be configured to control the activation and deactivation of the disconnect clutch 126 and the locking clutch 134, as described below.

Figure 2:
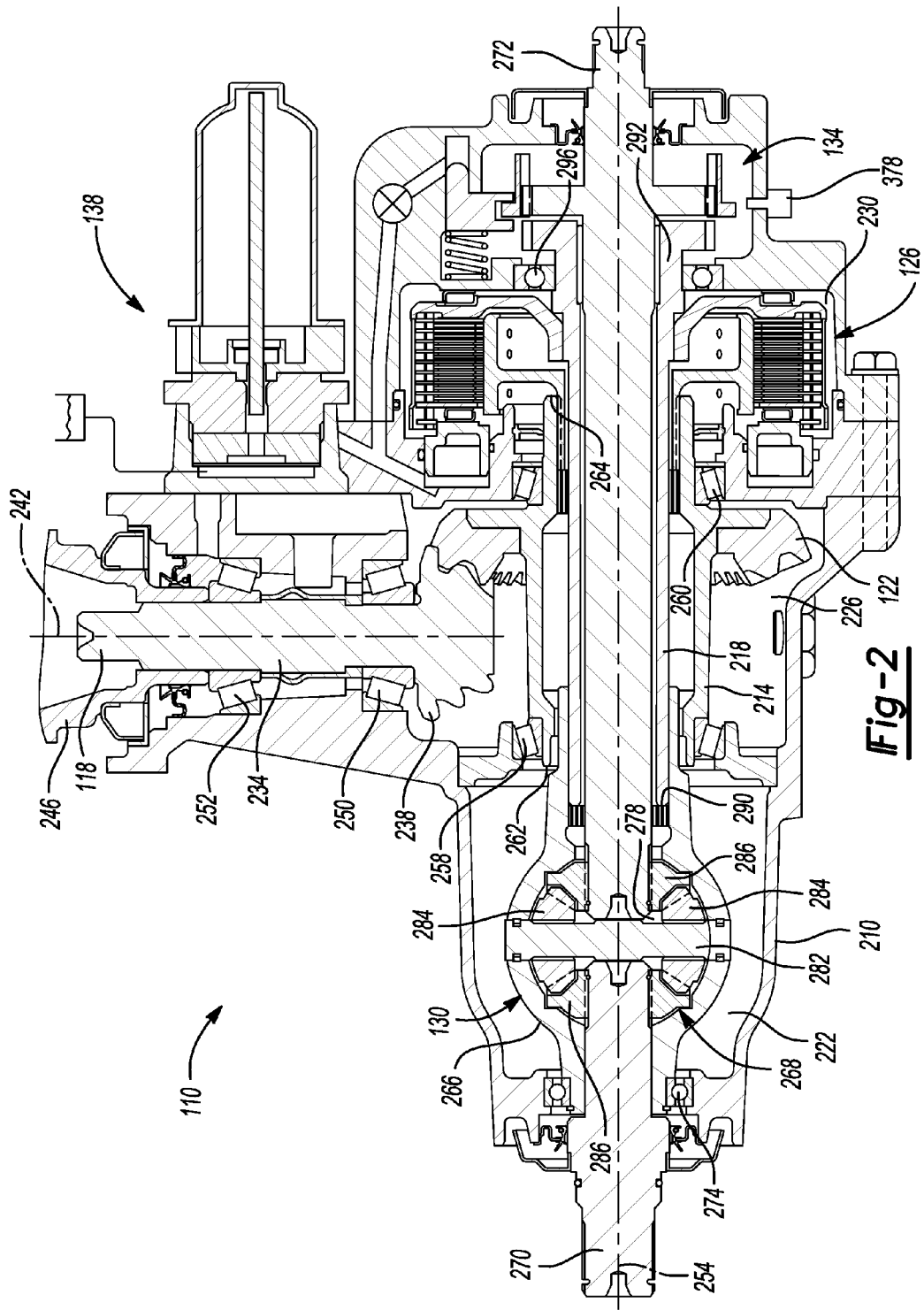
FIG. 2 is a sectional view of a portion of the AWD driveline including the rear drive module that is schematically illustrated in FIG. 1.

With additional reference to FIG. 2, the rear axle assembly 110 is illustrated in more detail. The rear axle assembly 110 can include a housing 210, the input pinion 118, the ring gear 122, the disconnect clutch 126, the second differential 130, the locking clutch 134, the clutch actuating system 138, a first intermediate member 214, and a second intermediate member 218.

The housing 210 can define one or more cavities or chambers and can be fixedly coupled to a rigid structure of the vehicle 10 (FIG. 1), such as a chassis (not specifically shown) of the vehicle 10 (FIG. 1) for example. The housing 210 can be formed of multiple shells or parts that are coupled together (e.g. bolted or welded) to define the chambers. In the example provided, the housing 210 defines a differential chamber 222, a hypoid gear chamber 226, and a clutch chamber 230 that can be separated by features of the rear axle assembly 110.

The input pinion 118 can include a pinion shaft 234 and a pinion gear 238 that is non-rotatably coupled to one end of the pinion shaft 234. The pinion gear 238 can be received in the hypoid gear chamber 226 and the pinion shaft 234 can extend along a first axis 242 and through a side of the housing 210. The end of the pinion shaft 234 opposite the pinion gear 238 can be coupled for common rotation with the propshaft 68 (FIG. 1). In the example provided, the pinion shaft 234 is coupled to the propshaft 68 (FIG. 1) by a flange 246 that is non-rotatably coupled to the pinion shaft 234 and can be coupled (e.g. bolted) to a mating flange (not specifically shown) that is non-rotatably coupled to the propshaft 68 (FIG. 1). In the example provided, the input pinion 118 is supported within the housing 210 for rotation about the first axis 242 by a head bearing 250 and a tail bearing 252. The head bearing 250 can be disposed radially between the pinion shaft 234 and the housing 210 proximate to the pinion gear 238. The tail bearing 252 can be disposed radially between the pinion shaft 234 and the housing 210 proximate to the flange 246.

The ring gear 122 can be located within the hypoid gear chamber 226, meshingly engaged with the pinion gear 238, and can be disposed about a second axis 254 that can be transverse to the first axis 242. In the example provided, the pinion gear 238 and ring gear 122 are hypoid gears, though other configurations can be used.

The first intermediate member 214 can be supported within the housing 210 for rotation about the second axis 254. In the example provided, the first intermediate member 214 is supported within the housing 210 by a first bearing 258 and a second bearing 260, disposed generally at opposite axial ends 262, 264 of the first intermediate member 214. The ring gear 122 can be fixedly coupled (e.g. bolted or welded) to the first intermediate member 214 for common rotation about the second axis 254. In the example provided, the ring gear 122 is fixedly coupled to the first intermediate member 214 axially between the first and second bearings 258, 260.

The second differential 130 can include a second differential case 266, a second differential gear set 268, a first output member 270, and a second output member 272. The second differential case 266 can be located in the differential chamber 222 and can be supported within the housing 210 for rotation about the second axis 254. In the example provided, the second differential case 266 is supported by a third bearing 274. The second differential case 266 can define a differential cavity 278. The second differential gear set 268 can be located within the differential cavity 278 and can be configured to receive input torque from the second differential case 266 while outputting differential torque to the first and second output members 270, 272.

In the example provided, the second differential gear set 268 is an open differential including a cross pin 282, a pair of pinion gears 284, and a pair of side gears 286. The cross pin 282 can be coupled to the second differential case 266 for common rotation about the second axis 254. The pinion gears 284 can be coupled to the cross pin 282 for common rotation about the second axis 254, while being rotatable about the cross pin 282. The side gears 286 can be rotatable relative to the second differential case 266 and can be meshingly engaged to the pinion gears 284. One of the side gears 286 can be coupled to the first output member 270 for common rotation about the second axis 254. The other of the side gears 286 can be coupled to the second output member 272 for common rotation about the second axis 254. The first output member 270 can be coupled for common rotation with the third half-shaft 142 and the second output member 272 can be coupled for common rotation with the fourth half-shaft 146.

The second intermediate member 218 can be located within the housing 210 and disposed about the second axis 254. One end 290 of the second intermediate member 218 can be fixedly coupled to the second differential case 266 for common rotation about the second axis 254. The second intermediate member 218 can be radially inward of the first intermediate member 214 and can extend axially through the first intermediate member 214 and can be rotatable relative to the first intermediate member 214. An other end 292 of the second intermediate member 218, opposite the end 290, can be supported within the housing 210 (e.g. within the clutch chamber 230) via a fourth bearing 296. The second output member 272 can be radially inward of the second intermediate member 218 and can be rotatable relative to the second intermediate member 218. The second output member 272 can extend axially through the second intermediate member 218.

Figure 3:
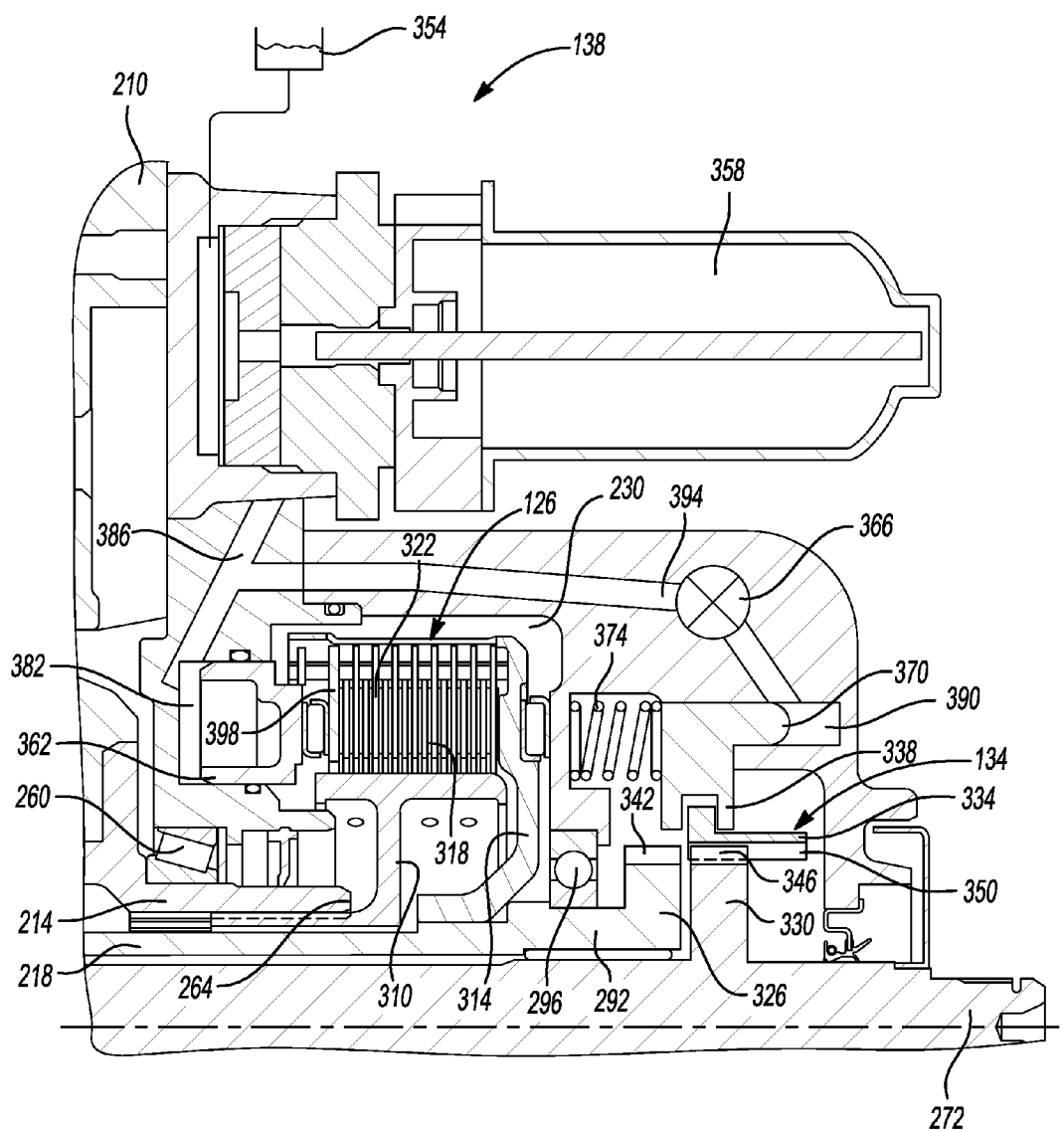
FIG. 3 is a sectional view of a portion of the rear drive module shown in FIG. 2.

With additional reference to FIG. 3, the disconnect clutch 126 can be generally located within the clutch chamber 230 and can include an inner plate carrier 310, an outer plate carrier 314, a plurality of first clutch plates 318, and a plurality of second clutch plates 322. The inner plate carrier 310 can be fixedly coupled to the first intermediate member 214 for common rotation about the second axis 254. In the example provided, the inner plate carrier 310 is fixedly coupled to the end 264 of the first intermediate member 214 that is distal to the second differential 130. The first clutch plates 318 can be coupled to the inner plate carrier 310 for common rotation about the second axis 254, but can be configured such that the first clutch plates 318 can slide axially relative to the inner plate carrier 310.

The outer plate carrier 314 can be fixedly coupled to the other end 292 of the second intermediate member 218 for common rotation about the second axis 254. The second clutch plates 322 can be coupled to the outer plate carrier 314 for common rotation about the second axis 254, but can be configured such that the second clutch plates 322 can slide axially relative to the outer plate carrier 314. The first and second clutch plates 318, 322 can be interleaved between the inner and outer plate carriers 310, 314.

The locking clutch 134 can include a first locking member 326, a second locking member 330, a clutch member, sleeve or collar 334, and a shift fork 338. The first locking member 326 can be fixedly coupled to the second intermediate member 218 for common rotation about the second axis 254. Thus, the first locking member 326 can be non-rotatably coupled to the second differential case 266. The first locking member 326 can define a plurality of external first locking teeth or splines 342 disposed within the clutch chamber 230 such that the disconnect clutch 126 can be disposed axially between the first locking splines 342 and the second differential 130.

The second locking member 330 can be fixedly coupled to the second output member 272 for common rotation about the second axis 254. Thus the second locking member 330 can be non-rotatably coupled to one of the side gears 286 of the second differential 130. The second locking member 330 can define a plurality of external second locking teeth or splines 346 disposed within the clutch chamber 230 such that the first locking splines 342 can be located axially between the disconnect clutch 126 and the second locking splines 346. The sleeve 334 can be disposed about the second axis 254 and can define a set of internal mating teeth or splines 350 that can be configured to engage the first and second locking splines 342, 346.

The first locking splines 342, the second locking splines 346, and the mating splines 350 can be configured such that the sleeve 334 can slide axially relative to the first and second locking members 326, 330 while being engaged to either or both of the first and second locking members 326, 330 for common rotation. The sleeve 334 can be axially slidable between an unlocked position (shown in FIGS. 2 and 3) and a locked position. In the unlocked position, the mating splines 350 of the sleeve 334 engage either the first locking splines 342 or the second locking splines 346, but not both. In the locked position, the mating splines 350 of the sleeve 334 engage the first locking splines 342 and the second locking splines 346 such that the second differential case 266 is coupled to the second output member 272 for common rotation via the sleeve 334. The shift fork 338 can be configured to move the sleeve 334 axially between the unlocked position and the locked position. In the example provided, the shift fork 338 is coupled to the sleeve 334 for common axial movement, while permitting the sleeve 334 to rotate about the second axis 254 relative to the shift fork 338.

The clutch actuating system 138 can selectively engage and disengage the disconnect clutch 126 and can selectively move the sleeve 334 between the unlocked and locked positions. The clutch actuating system 138 can include a reservoir 354, a pump 358, a first piston 362, a valve 366, and a second piston 370. In the example provided, the clutch actuating system 138 can also include a return spring 374 and a position sensor 378 (FIG. 2).

The reservoir 354 can be fluidly coupled to the pump 358. The reservoir 354 can be configured to hold a volume of liquid, such as hydraulic fluid for example. While schematically shown, the reservoir 354 can be defined by the housing 210 or can be a separate container that is fluidly coupled to the pump 358. In the example provided, the pump 358 can be mounted to the housing 210 and can be a reversible pump configured to pump fluid from the reservoir 354 in a forward mode and to the reservoir 354 in a reverse mode.

The housing 210 can also define a first piston cavity 382, a first conduit 386, a second piston cavity 390, and a second conduit 394. The first conduit 386 can fluidly couple the pump 358 to the first piston cavity 382. The first piston 362 can be an annular body disposed about the second axis 254 and received in the first piston cavity 382. The first piston 362 can be configured such that operation of the pump 358 in the forward mode can pump fluid from the reservoir 354, through the first conduit 386, and into the first piston cavity 382 to move the first piston 362 axially toward the first and second clutch plates 318, 322. The first piston 362 can exert an axial force on a pressure plate 398 that can move the first and second clutch plates 318, 322 axially together and into engagement to transfer torque from the inner plate carrier 310 to the outer plate carrier 314. The pump 358 can be configured such that operation of the pump 358 in the reverse mode can pump fluid from the first piston cavity 382, through the first conduit 386, and back to the reservoir 354 to move the first piston 362 away from the first and second clutch plates 318, 322 to permit the first and second clutch plates 318, 322 to separate to limit or prevent transfer of torque therebetween.

The second conduit 394 can fluidly couple the pump 358 to the second piston cavity 390. In the example provided, the second conduit 394 is in fluid communication with the first conduit 386. The valve 366 can be in fluid communication with the second conduit 394. The valve 366 can be any suitable type of valve. In the example provided, the valve 366 is a servo valve in communication with a controller (shown in FIG. 1). The controller (FIG. 1) can selectively operate the valve 366 in a plurality of modes. The valve 366 can be operated in an open mode wherein the valve 366 permits fluid communication between the second conduit 394 and the second piston cavity 390, and in a closed mode wherein the valve 366 prevents fluid communication between the second conduit 394 and the second piston cavity 390.

The second piston 370 can be received in the second piston cavity 390 and can be fixedly coupled to the shift fork 338 for common axial translation. The second piston 370 can be configured such that when the fluid is under pressure in the first conduit 386 and the first piston cavity 382, the valve 366 can be opened to permit fluid in the first conduit 386 or the first piston cavity 382 to exert fluid pressure into the second piston cavity 390 via the second conduit 394. When fluid pressure in the second piston cavity 390 increases, the fluid pressure can move the second piston 370 axially to move the sleeve 334 from the unlocked position to the locked position.

In the example provided, the return spring 374 can engage the second piston 370 or the shift fork 338 to bias the sleeve 334 toward the unlocked position. The fluid pressure from the first conduit 386 or the first piston cavity 382 can overcome the biasing force of the return spring 374. In the example provided, when the valve 366 is open and pressure is allowed to decrease in the first conduit 386 or the first piston cavity 382, the return spring 374 can overcome the decreased pressure in the second piston cavity 390 to move the second piston 370 and the sleeve 334 to the unlocked position.

For example, a bleed conduit (not specifically shown) can fluidly couple the reservoir 354 to the first piston cavity 382 and/or the second piston cavity 390 to permit fluid to bleed back to the reservoir 354. The fluid can bleed from the bleed conduit (not shown) to the reservoir 354 at a rate that is less than the rate that fluid can be pumped by the pump 358 such that elevated pressure can be maintained within the first and second piston cavities 382, 390 when the pump 358 is operated in the forward mode, but pressure can reduce and be overcome by the return spring 374 when the pump 358 is not operated. The return spring 374 can be configured such that the reduced pressure that the return spring 374 can overcome can still be sufficient to engage the disconnect clutch 126 to transmit differential torque to the wheels 114 (FIG. 1).

The position sensor 378 (shown in FIG. 2) can be coupled to the housing 210 and configured to detect the position of the locking clutch 134 (e.g. the position of the sleeve 334 or the shift fork 338). The position sensor 378 (FIG. 2) can be any suitable type of sensor, such as a contact sensor, proximity sensor, or a Hall Effect sensor for example. The position sensor 378 (FIG. 2) can be in communication with the controller (FIG. 1). The controller (FIG. 1) can be configured to control operation of the valve 366 based in part on the position of the sleeve 334 detected from the position sensor 378 (FIG. 2). For example, when the valve 366 is open to allow pressure to decrease and the sleeve 334 to be moved from the locked position to the unlocked position, the controller (FIG. 1) can receive position information from the position sensor 378. The controller (FIG. 1) can send a command signal to the valve 366 to close the valve 366 when the sleeve 334 is disengaged from the first locking member 326.

In an alternative configuration, not specifically shown, the position sensor 378 can be located elsewhere to determine the locked or unlocked position of the sleeve 334 indirectly. For example, the position sensor 378 can be configured to determine the rotational speeds of the wheels 114. If a rotational speed difference is detected, then it can be determined that the sleeve 334 is in the unlocked position. If no rotational speed difference is detected, either the sleeve 334 is in the locked position, or the vehicle 10 (FIG. 1) is not turning. Accordingly, an additional sensor (not specifically shown) can detect a secondary parameter, such as the steering angle of the vehicle 10 to determine if the vehicle 10 is turning, and thus if the sleeve 334 is in the locked position.

In operation, when differential rotary power is desired at the wheels 114 (FIG. 1), the pump 358 can be operated in the forward mode while the valve 366 is closed, to engage the disconnect clutch 126 to transmit torque from the ring gear 122 (FIG. 2) to the second differential case 266 (FIG. 2). When rotary power is not desired at the wheels 114 (FIG. 1), the pump 358 can be operated in the reverse mode to disengage the disconnect clutch 126. When equal torque is desired at the wheels 114 (FIG. 1), the pump 358 can be operated in the forward mode to increase pressure in the first piston cavity 382 and the valve 366 can be opened, to engage the disconnect clutch 126 and also move the sleeve 334 to the locked position to couple the second differential case 266 (FIG. 2) to the fourth half-shaft 146 for common rotation. To move the sleeve 334 from the locked position, back to the unlocked position, the pressure in the first piston cavity 382 can be allowed to reduce such that the return spring 374 can overcome the reduced pressure to move the sleeve 334 and second piston 370 to the unlocked position.

Figure 4:
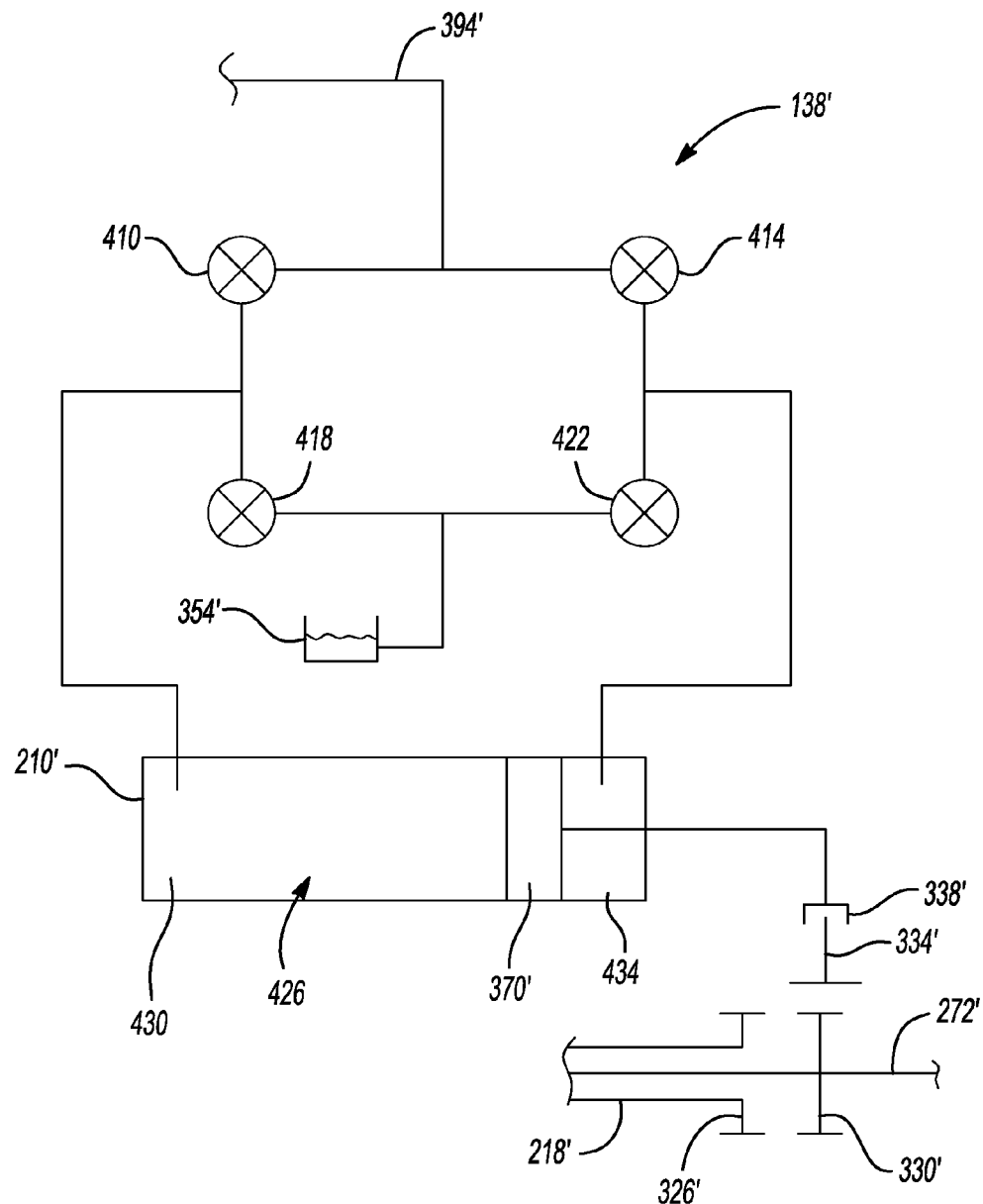
FIG. 4 is a schematic view of a portion of a rear drive module of a second construction.

A portion of an alternative construction of the clutch actuating system 138' is schematically shown in FIG. 4. The clutch actuating system 138' can be similar to the clutch actuating system 138 (FIGS. 2 and 3) except as otherwise shown or described herein. Similar elements of the secondary driveline 20 are schematically shown in FIG. 4 and indicated by similar but primed reference numerals. The descriptions of the similar elements are incorporated herein by reference. In the clutch actuating system 138', the valve 366 (FIG. 3) can be replaced by four servo valves (first valve 410, second valve 414, third valve 418, and fourth valve 422) that can be generally in a Wheatstone arrangement.

In this construction, the housing 210' can define a second piston cavity 426 having a first side 430 and a second side 434 fluidly separated by the second piston 370' which can be slidably received in the second piston cavity 426. The second conduit 394' can be fluidly coupled to the first valve 410 and the second valve 414. The first side 430 of the second piston cavity 426 can be fluidly coupled to the first valve 410 and the third valve 418. The second side 434 of the second piston cavity 426 can be fluidly coupled to the second valve 414 and the fourth valve 422. The reservoir 354' can be fluidly coupled to the third valve 418 and the fourth valve 422.

To move the sleeve 334' from the unlocked position (shown in FIG. 4) to the locked position, the first valve 410 and fourth valve 422 can be closed while the second valve 414 and the third valve 418 are open. Thus, fluid can flow from the second conduit 394' through the second valve 414 and to the second side 434 of the second piston cavity 426 while fluid can exit the first side 430 of the second piston cavity 426 to be returned to the reservoir 354' through the third valve 418. Thus the second piston 370' can move axially to move the sleeve 334' into engagement with the first and second locking members 326', 330'.

To move the sleeve 334' from the locked position to the unlocked position (shown in FIG. 4), the first valve 410 and fourth valve 422 can be opened while the second valve 414 and the third valve 418 are closed. Thus, fluid can flow from the second conduit 394' through the first valve 410 and to the first side 430 of the second piston cavity 426 while fluid can exit the second side 434 of the second piston cavity 426 to be returned to the reservoir 354' through the fourth valve 422. Thus the second piston 370' can move axially to move the sleeve 334' out of engagement with the first locking member 326'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An all-wheel drive vehicle driveline comprising:
a housing assembly with a first fluid conduit and a second fluid conduit;
an input pinion received in the housing assembly;
an input member that is received in the housing assembly and rotatable about a differential axis;
a ring gear coupled to the input member for rotation in the housing assembly about the differential axis;
a differential received in the housing assembly, the differential including a case member, a differential gear set, a first differential output, and a second differential output, the differential gear set transmitting rotary power between the case member and the first and second differential outputs;
a pump coupled to the housing, the pump having a pump outlet that is in fluid communication with the first conduit;
an intermediate shaft received coaxially through the input member, the intermediate shaft being coupled to the case member for common rotation about the differential axis;
a first clutch configured to transmit torque between the input member and the case member when a pressure in the first conduit exceeds a first predetermined pressure, the first clutch having a first clutch input, which is coupled to the input member for rotation therewith, and a first clutch output, which is coupled to the intermediate shaft for rotation therewith;
a first valve coupling the first conduit to the second conduit; and
a second clutch configured to couple the case member to the first differential output for common rotation when a pressure in the second conduit exceeds a second predetermined pressure that is greater than the first predetermined pressure;
wherein when the first valve is open, the first valve permits fluid communication from the first conduit to the second conduit, and when the first valve is closed, the first valve inhibits fluid communication from the first conduit to the second conduit.

2. The all-wheel drive vehicle driveline of claim 1, wherein the first clutch includes a first piston chamber, a first piston, a plurality of first clutch plates, which are coupled to the first clutch input for rotation therewith, and a plurality of second clutch plates that are coupled for rotation with the first clutch output and interleaved with the first clutch plates, wherein the first piston chamber is in fluid communication with the first conduit and when the pressure in the first conduit exceeds the first predetermined pressure, the pressure in the first piston chamber moves the first piston from a first position that is retracted relative to the first and second clutch plates to a second position that is extended toward the first and second clutch plates to a greater extent than when the first piston is in the first position.

3. The all-wheel drive vehicle driveline of claim 2, wherein the second clutch includes a second piston chamber, a second piston, a first locking member, a second locking member, and a clutch member, wherein the second piston chamber is in fluid communication with the second conduit, the first locking member is coupled to the case member for common rotation, the second locking member is coupled to the first differential output for common rotation, and the clutch member is movable between a first position wherein the clutch member is rotatable relative to one of the first or second locking members, and a second position wherein the clutch member is coupled for common rotation with the first and second locking members, wherein when the pressure in the second conduit exceeds the second predetermined pressure, the pressure in the second piston chamber drives the second piston to move the clutch member from the first position to the second position.

4. The all-wheel drive vehicle driveline of claim 3, wherein the clutch member is a collar defining a plurality of inner splines that are configured to engage a plurality of outer splines defined by the first and second locking members.

5. The all-wheel drive vehicle driveline of claim 3, wherein the second clutch includes a return spring configured to bias the clutch member toward the first position.

6. The all-wheel drive vehicle driveline of claim 3, wherein the second piston separates the second piston chamber into a first side and a second side, and the first valve is one of a plurality of valves, wherein the plurality of valves are operable in a first mode wherein fluid communication is permitted from the second conduit to the first side of the second piston chamber and fluid communication is permitted from the second side of the second piston chamber to a reservoir, and a second mode wherein fluid communication is permitted from the first side of the second piston chamber to the reservoir and fluid communication is permitted from the second conduit to the second side of the second piston chamber.

7. The all-wheel drive vehicle driveline of claim 1, wherein the second clutch comprises a second clutch input, a second clutch output, and wherein the all-wheel drive vehicle driveline further comprises a piston and a spring, the piston being movable along the differential axis between a first position and a second position, wherein the second clutch transmits rotary power between the second clutch input and the second clutch output when the piston is in the second position, and wherein the spring biases the piston toward the first position.

8. The all-wheel drive vehicle driveline of claim 7, wherein the second clutch further comprises a clutch member that is movable along the differential axis to selectively couple the second clutch input to the second clutch output.

9. The all-wheel drive vehicle driveline of claim 8, further comprising a sensor coupled to the housing, the sensor being configured to sense a position of the clutch member and responsively generate a sensor signal indicative of the position of the clutch member.

10. The all-wheel drive vehicle driveline of claim 8, wherein the second clutch comprises a clutch fork that is coupled to the piston for movement therewith, wherein one of the clutch fork and the clutch member defines an annular groove into which a portion of the other one of the clutch fork and the clutch member is received.

11. The all-wheel drive vehicle driveline of claim 7, wherein the housing had an annular wall member that is disposed along the differential axis between the first clutch and the second clutch, and wherein the spring is disposed between the annular wall member and the piston.

12. The all-wheel drive vehicle driveline of claim 1, wherein the first clutch is a friction clutch having an outer clutch basket that is coupled to the intermediate shaft for rotation therewith, wherein the second clutch comprises a plurality of teeth that are formed about a circumference of the intermediate shaft, and wherein a bearing is disposed between the housing and the intermediate shaft along the differential axis between the outer clutch basket and the teeth on the circumference of the intermediate shaft.

* * * * *